(12) United States Patent
Wu

(10) Patent No.: US 7,342,957 B2
(45) Date of Patent: Mar. 11, 2008

(54) SYMBOL TIMING RECOVERY METHOD FOR DMT-VDSL

(75) Inventor: Cheng-Shing Wu, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 679 days.

(21) Appl. No.: 10/826,307

(22) Filed: Apr. 19, 2004

(65) Prior Publication Data

US 2005/0152441 A1    Jul. 14, 2005

(30) Foreign Application Priority Data

Jan. 13, 2004    (TW) .............................. 93100839 A

(51) Int. Cl.
*H04B 1/38* (2006.01)
(52) U.S. Cl. ....................................... 375/222; 375/260
(58) Field of Classification Search ................ 375/222, 375/260, 354, 355
See application file for complete search history.

(56) References Cited

U.S. PATENT DOCUMENTS

| 6,279,022 B1 | 8/2001 | Miao et al. |
| 2003/0198310 A1* | 10/2003 | Fanson et al. .............. 375/371 |
| 2004/0141570 A1* | 7/2004 | Yamazaki et al. .......... 375/340 |

OTHER PUBLICATIONS

Pollet et al., IEEE Communications Magazine, Apr. 1999, p. 80-86.

* cited by examiner

*Primary Examiner*—David C. Payne
*Assistant Examiner*—Leon Flores
(74) *Attorney, Agent, or Firm*—Birch, Stewart, Kolasch & Birch, LLP

(57) ABSTRACT

A symbol timing recovery method for DMT-VDSL is provided. The method converts the extracted sample to the frequency domain. Using the peaks and the company peaks in the frequency domain, the method determines the correct position of a peak response, thereby calibrating the sample extraction position. Thus, the symbol timing can be recovered.

12 Claims, 6 Drawing Sheets

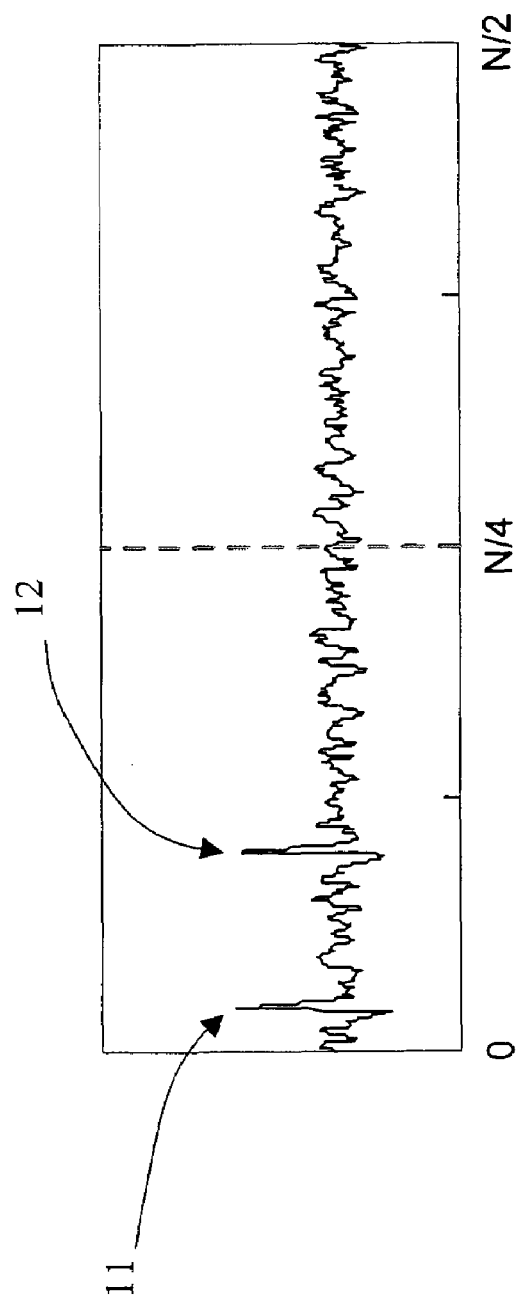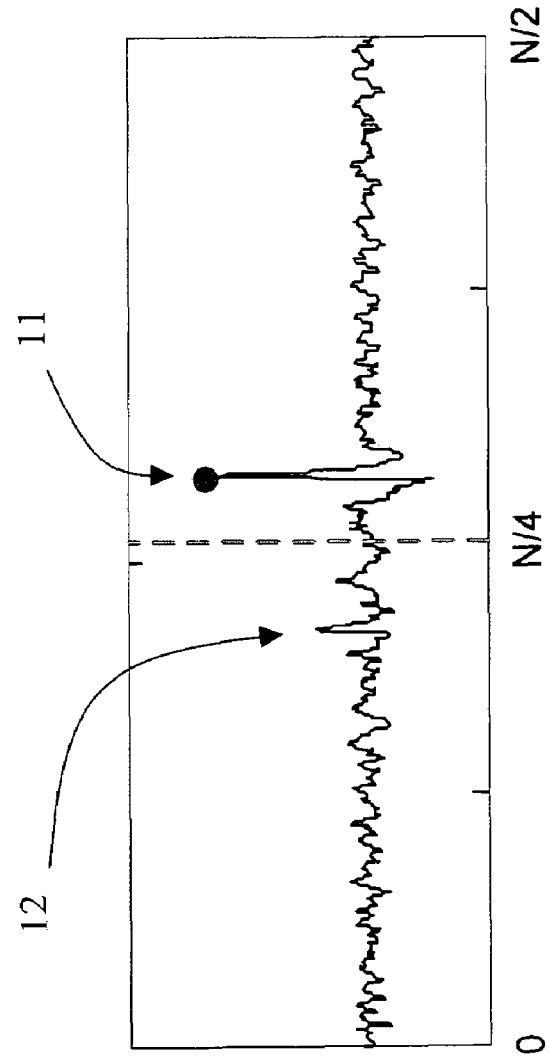

SYMBOL TIMING RECOVERY METHOD FOR DMT-VDSL

This Non-provisional application claims priority under 35 U.S.C. § 119(a) on patent application No(s). 093100839 filed in Taiwan on Jan. 13, 2004, the entire contents of which are hereby incorporated by reference.

BACKGROUND OF THE INVENTION

1. Field of Invention

The invention relates to a symbol timing recovery method used in DMT-VDSL and, in particular, to a method that uses the peaks and the company peaks in the frequency domain to calibrate the symbol timing.

2. Related Art

The very high data rate digital subscriber line (VDSL) utilizes the discrete multi-tone (DMT) technology. In comparison with the commonly seen asymmetric digital subscriber line (ADSL), the transmission speed of VDSL is higher (ADSL: 1.5-8M/0.3-2 Mbps 'VDSL: 2-26M/2-16 Mbps) but the transmission distance of VDSL is shorter (ADSL: 4.8 km 'VDSL: 1.5 km). From the above-mentioned technical features, one sees that the ADSL technique is more suitable for an environment with users living over 1 km away from the telecommunication company. The users can enjoy the ADSL service using the existing phone lines. The VDSL technique is more suitable for an environment of community-type high-rise buildings. Fibers are connected from the telecommunication company to the high-rise building, where the community shares the bandwidth and the each individual user connects to the hub using the VDSL technique.

During data transmissions, the DMT-VDSL has to first encode the data and perform an inverse fast Fourier transform (IFFT). Before transmitting the converted signals, each discrete multi-tone signal is added with a cyclic extension (CE) to avoid inter-symbol interference (ISI), echoes, or cross-talks during transmissions. Once the receiving end receives the signals, it first removes the CE parts, performs a fast Fourier transform (FFT), and decodes to recover the original data. In this process, one has to accurately compute the boundary positions in order to remove the CE parts.

In the prior art, recovering the symbol timing in the time domain is achieved by utilizing the repeated data property of the CE's, where part of the rear data are copied to the front of the symbol and part of the front data to the end of the symbol after the IFFT. Therefore, when the receiving end gets a signal, the whole signal is delayed by N-samples, where N is equal to the DMT symbol length. Then, correlation is computed between the original signal and the delayed signal. The section with a high correlation is the boundary. However, the precision of this method is low in practice and it requires a lot of memory.

On the other hand, the method of recovering the symbol timing in the frequency domain is to extract a section of the received signal that is equal to the length of the DMT symbol arbitrary. Then, it is converted into the frequency domain using the FFT. The channel frequency response is computed in the frequency domain and converted back into the time domain to give the channel impulse response. Theoretically speaking, the channel impulse response has a peak response relative to the boundary of the DMT signal. Therefore, one can use this method to obtain the correct boundary position. The most commonly seen ADSL can use the above method to recover the symbol timing.

However, the VDSL is different from other transmission modes. During the VDSL training phase, the odd tone of the DMT symbol is used to transmit information to be exchanged between two VDSL transceivers. Therefore, when computing the channel frequency response, we cannot know all the band responses. This will result in two peak responses of equal height. In addition, when extracting a section of original symbols (including CE) and converting them into the frequency domain, if the extracted signal has two adjacent symbols both of them will generate peak responses. Combining the above two effects, one usually obtain four peak responses when using the conventional frequency domain symbol timing recovery method to compute the channel impulse response. Unfortunately, we cannot know which one is the correct peak response corresponding to the symbol boundary.

The method used in the ADSL technique cannot be directly applied to the VDSL technique. The U.S. Pat. No. 6,279,022 compares a known transmission frequency-domain pattern and the received frequency-domain symbol and computes to obtain the location of the peak response, thereby determining the boundary. It uses primarily the fact that the receiver in the ADSL transmission can obtain in advance all the symbols the transmitter will send. However, the there is no way to obtain all the symbols in advance in the VDSL system. Therefore, the method does not apply here.

SUMMARY OF THE INVENTION

In view of the foregoing, the invention provides a symbol timing recovery method for the discrete multi-tone very high data rate digital subscriber line (DMT-VDSL). The method not only reduces the usage of memory, but also effectively recovers the VDSL symbol timing.

The disclosed method extracts from the received signal a sample equal in length to the symbol and converts the sample to the frequency domain. It further computes the channel frequency response, and then converts it back into the time domain. From the position of the channel impulse peak in the time domain, the method obtains the company peak at the position with one cycle extension from the channel impulse peak. Using the powers of the peak and the company peak, the method determines the position of the company peak. The position of the peak determines the correct peak response, from which the calibration displacement is obtained to recover symbol timing.

BRIEF DESCRIPTION OF THE DRAWINGS

The invention will become more fully understood from the detailed description given herein below illustration only, and thus are not limitative of the present invention, and wherein:

FIGS. 2A and 2B are schematic views of the company peaks of the invention;

DETAILED DESCRIPTION OF THE INVENTION

Figure 1:
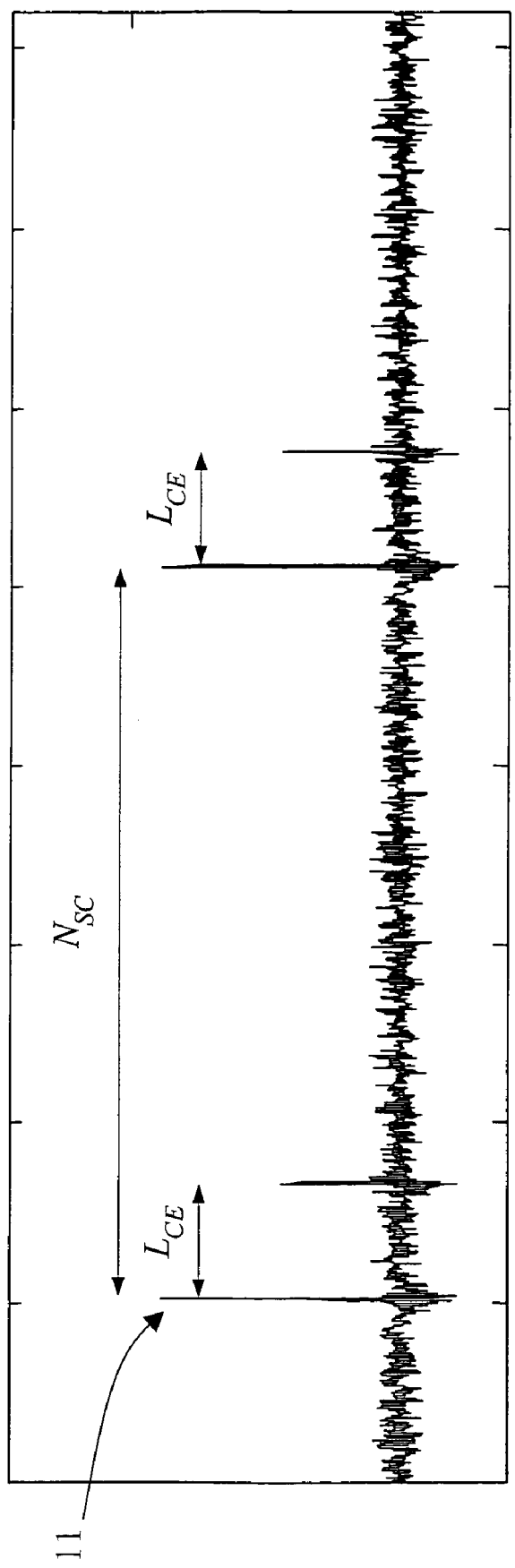
FIG. 1 is a schematic view of the extracted sample being converted into the frequency domain according to the invention.

With reference to FIG. 1, the discrete multi-tone very high data rate digital subscriber line (DMT-VDSL) method extracts from a DMT-VDSL signal a sample with a length equal to the symbol length N and converts it to the frequency domain. If the extracted sample crosses two adjacent symbols, the computed channel impulse response should have four peak responses because both the odd tone and the even tone of the VDSL contain specific information. Therefore, an extra peak response set is obtained. The powers of the two peak response sets are equal in magnitude and the distance is a fixed quantity $N_{sc}$ (N/2). Each peak response set has two peak responses because the extracted sample 14 crosses two adjacent symbols 13 (see FIG. 3). The powers of the two peak responses differ for different extraction lengths, but the distance is always the length of CE, $L_{CE}$.

Figure 6:
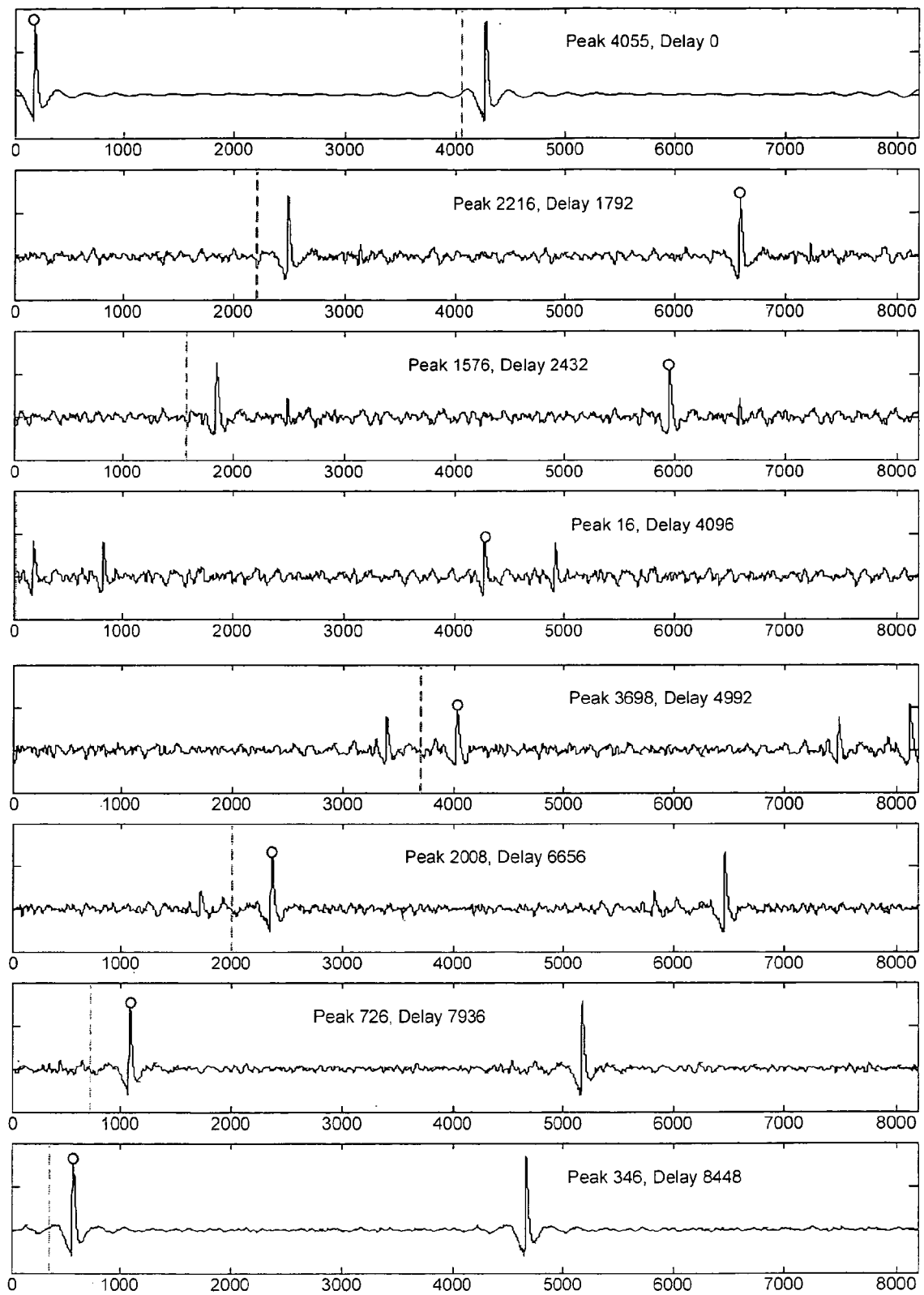
FIG. 6 is a schematic view of the simulated symbols being converted into the frequency domain.

Please refer to FIG. 6 that shows the simulated channel impulse responses. Each plot therein has a corresponding time delay. The dashed line represents the DMT symbol boundary in reality. The peak response labeled by a circular dot is the actual peak response. The other equal peak response is produced by the reason described above. Independent of the relation between the extraction position and the boundary position, there are at least two peak responses. Therefore, one only needs to consider half of the channel impulse responses in order to know which peak response is true. From the true peak response position, one can know the symbol boundary position and make a calibration of the displacement Δ (see FIG. 3).

Take the first half region (0~N/2) as an example. As shown in FIGS. 2A and 2B, if the peak 11 is in the first quarter part (0-N/4) and it is a false peak response, a company peak 12 follows it at length of $L_{CE}$ (see FIG. 2A). On the other hand, if the peak 11 is in the second quarter part (N/4~N/2), a company peak 12 is in front of it at a length of $L_{CE}$ (see FIG. 2B) and the peak 11 is the true peak response. The power of the company peak 12 divided by the power of the peak 11 has to be greater than a predetermined power ratio v. The power is the height in the plot. It is computed using the formula:

$$P(L) = \begin{cases} \sum_{i=L}^{L+L_{CP}-1} h(i)^2 & \text{if } L + L_{CP} \le N \\ \sum_{i=L}^{N-1} h(i)^2 + \sum_{i=0}^{L+L_{CP}-1-N} h(i)^2 & \text{otherwise} \end{cases}$$

where h(i) is the result after inverse fast Fourier transform (IFFT) into the time domain.

Figure 3:
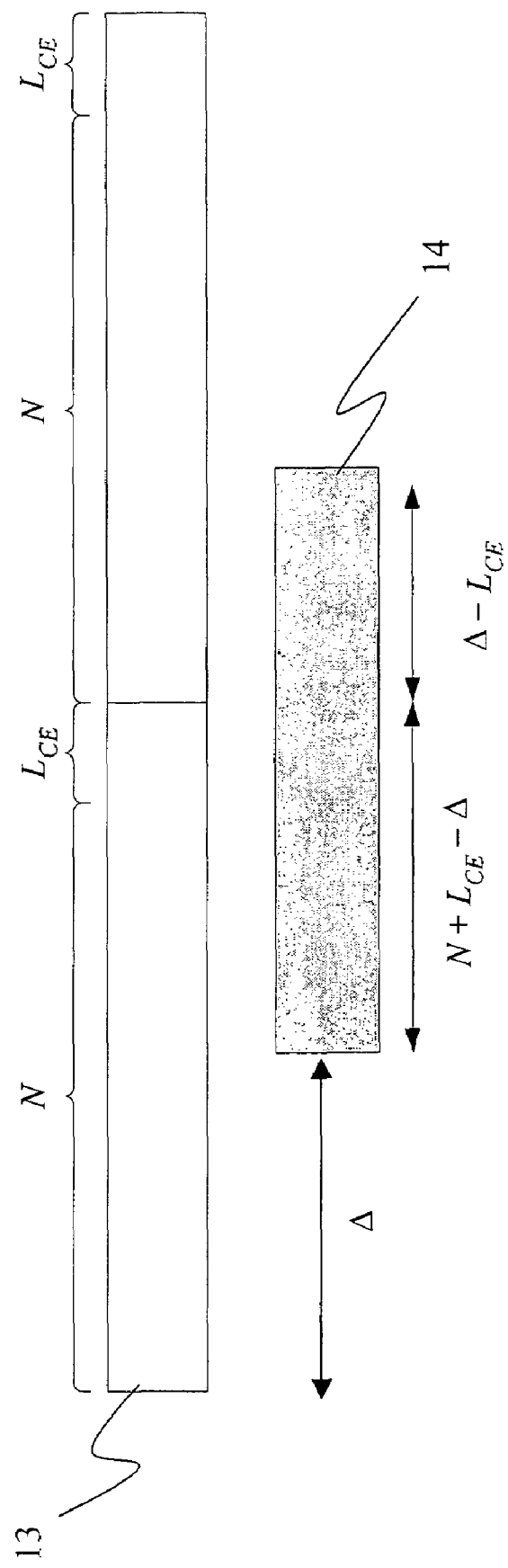
FIG. 3 is a schematic view of the extracted sample corresponding to the original symbol.

To compute the power ratio v, please refer to FIG. 3. The extracted sample 14 crosses two adjacent symbols 13 and has a displacement Δ from the boundary. Therefore, the powers contributed by the two symbols 13 are $$\frac{N + L_{CE} - \Delta}{N} \text{ and } \frac{\Delta - L_{CE}}{N},$$

respectively. Putting $\Delta = N_{sc}/2 = N/4$ into the above formula, one obtains $$\frac{0.75N + L_{CE}}{N} \text{ and } \frac{0.25N - L_{CE}}{N}.$$

The amplitudes are roughly 3:1 and the powers are thus 9:1. Therefore, one can define the power ratio to be 0.1.

In summary, one can obtain that when $L_0 \ge N_{SC}/2$ ($L_0$ being the position of the peak 11) the company peak 12 at the check position $L_1 = L_0 - L_{CE}$ is:

$$FLAG = \begin{cases} TRUE & \text{if } P(L_1) \ge P(L_0) * v \\ FALSE & \text{otherwise} \end{cases} \text{(see FIG. 2A)}$$

In other words, when the power of the company peak 12 satisfies the above equation, the corresponding peak 11 is the true peak response; otherwise, it is a false one. (In the above equation, FLAG represents a condition, TRUE represents true, and FLASE represents false.) When $L_0 < N_{SC}/2$, the company peak 12 at the check position $L_1 = L_0 + L_{CE}$ is:

$$FLAG = \begin{cases} FALSE & \text{if } P(L_1) > P(L_0) * v \\ TRUE & \text{otherwise} \end{cases} \text{(see FIG. 2B)}$$

Its determination is the same as before. One thus sees that the position of the true peak response $$\tau = \begin{cases} L_0 & \text{if } FLAG \text{ is } TRUE \\ L_0 + N_{SC} & \text{otherwise} \end{cases}.$$

Figure 4:
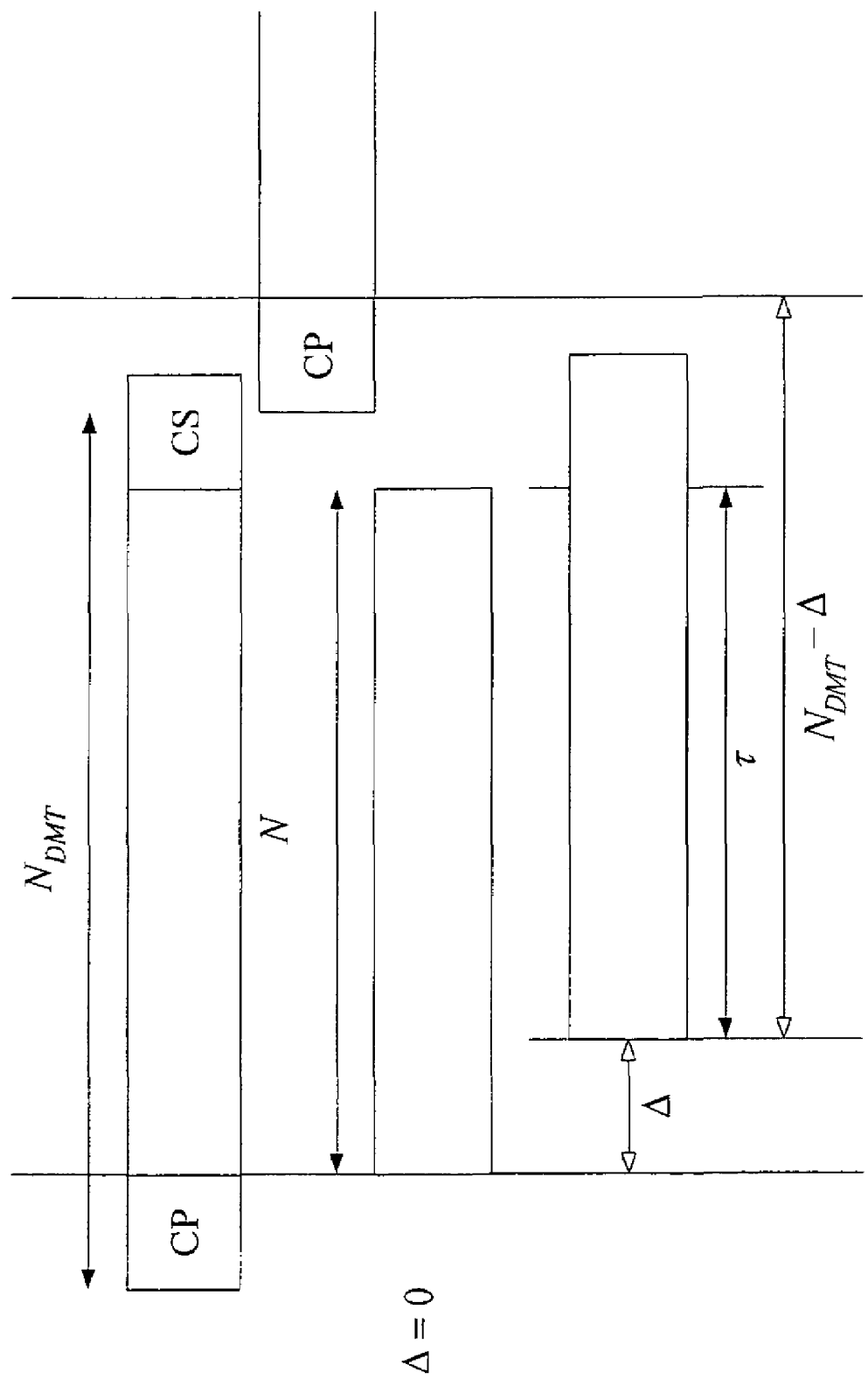
FIG. 4 is a schematic view of another embodiment of the invention.

The displacement Δ=N−τ. However, in the case where CE occurs in both the front and back, as shown in FIG. 4, CE contains a cyclic prefix (CP) and a cyclic suffix (CS). Then the displacement Δ is corrected as:

$$\Delta = \begin{cases} N - \tau & \text{if } \tau \ge N_{SC} \\ N_{DMT} - \tau & \text{otherwise} \end{cases}$$

where $N_{DMT} = N + CE - \beta$ and β represents the overlapped length of two adjacent DMT symbols defined by the VDSL standards.

Figure 5:
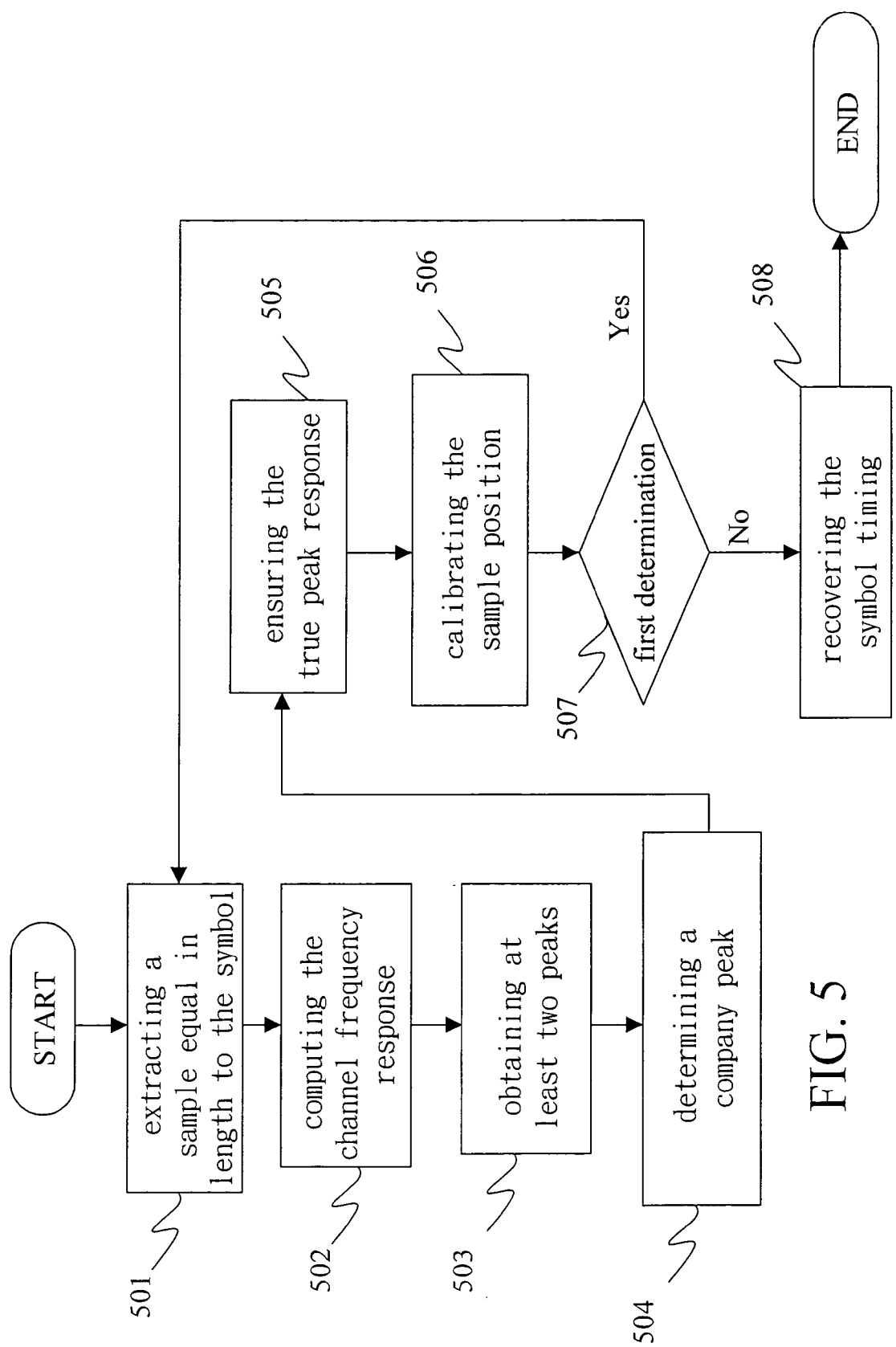
FIG. 5 is a schematic view of the steps in the disclosed method.

The flowchart of the invention is shown in FIG. 5. With further reference to FIG. 3, when a mixture of a signal and CE is received, the method extracts from it a sample equal in length to the symbol (step 501). The sample is converted into the frequency domain using the Fourier transform. The method then computes the channel frequency response in the frequency domain (step 502). The signal is the converted back into the time domain as the channel impulse response, obtaining at least two peaks 11 (step 503). The distance between the two peaks is half the symbol length $N_{SC}$, as shown in FIG. 1. A peak is selected according to the method described above. According to the position and power of the peak 11, the method determines a company peak 12 (step 504). From the powers, the method determines whether the selected peak 11 is the true peak response (step 505). The true peak is then used to calibrate the sample position (step 506).

In practice, if the extracted sample is very close to the position of CE (i.e. when τ approaches N), using τ for calibration will result in an error that only makes the calibrated sample away from the position but not to the correct position. Therefore, one can further compute and calibrate another time to find the optimized value. However, if each time the method has to determine whether τ approaches N, it results in additional memory waste and complicates the algorithm. Therefore, the invention can be modified to perform the determination twice. The method thus first checks whether it is the first determination (step 507). If it is, then step 501 is performed again. If it is the second time, then the symbol timing of the symbol can be recovered directly (step 508).

Certain variations would be apparent to those skilled in the art, which variations are considered within the spirit and scope of the claimed invention.

What is claimed is:

1. A symbol timing recovery method for discrete multi-tone very high data rate digital subscriber line (DMT-VDSL) to recover the correct symbol timing of a signal containing a plurality of DMT symbols and cyclic extensions, the method comprising the steps of:

extracting from the signal a sample equal in length to the symbol;

converting the sample into the frequency domain and computing its channel frequency response;

converting the channel frequency response into the time domain, obtaining two peaks;

selecting one of the peaks and using the position and power of the peak to determine a company peak;

using the company peak and a corresponding peak to determine whether the peak is a correct peak response; and using the peak response to calibrate the extraction position of the sample in the signal, thereby recovering the symbol timing of the signal, wherein the company peak is at a position of one cyclic extension from the peak and the position of the company peak $L_1$ is:

$L_1 = L_0 - L_{CE}$, when $N/2 \geq L_0 \geq N/4$; and $L_1 = L_0 + L_{CE}$, when $L_0 < N/4$;

where $L_0$ is the position of the corresponding peak, $L_{CE}$ is the position of one cyclic extension, and N is the symbol length.

2. The method of claim 1, wherein the two peaks are generated by converting two adjacent said symbols into the frequency domain.

3. The method of claim 2, wherein the powers of the two peaks are equal and the distance in between is half the length of the symbol.

4. The method of claim 1, wherein the company peak is at a position of one cyclic extension from the peak.

5. The method of claim 1 using the condition whether the power the company peak satisfies the relation $P(L_1) \geq P(L_0)*v$ and the position of the peak to determine whether the peak is a correct peak response, wherein $P(L_1)$ is the power of the company peak, $P(L_0)$ is the power of the peak, and v is a power ratio.

6. The method of claim 5, wherein the power ratio is preferably 0.1.

7. The method of claim 5, wherein the determination condition of the peak response is:

$$FLAG = \begin{cases} TRUE & \text{if } P(L_1) \geq P(L_0)*v \\ FALSE & \text{otherwise} \end{cases}, \text{ when } N/2 \geq L_0 \geq N/4;$$

and $$FLAG = \begin{cases} FALSE & \text{if } P(L_1) > P(L_0)*v \\ TRUE & \text{otherwise} \end{cases}, \text{ when } L_0 < N/4;$$

where FLAG represents the determination condition, TRUE means that the peak is true, and FALSE means that the peak is false.

8. The method of claim 7, wherein the position of the peak response τ is:

$$\tau = \begin{cases} L_0 & \text{if } FLAG \text{ is } TRUE \\ L_0 + N_{SC} & \text{otherwise.} \end{cases}$$

9. The method of claim 8, wherein the sample requires a calibration displacement $\Delta = N - \tau$.

10. The method of claim 8, wherein the sample requires a calibration displacement $$\Delta = \begin{cases} N - \tau & \text{if } \tau \geq N/2 \\ N_{DMT} - \tau & \text{otherwise} \end{cases},$$

where $N_{DMT}$ is the length of the DMT symbol.

11. The method of claim 10, wherein the DMT symbol length satisfies $N_{DMT} = N + CE - \beta$ where β is the overlapped length of the DMT symbols.

12. The method of claim 1, after the step of using the peak response to calibrate the extraction position of the sample in the signal, further comprising the step of repeating all the steps before it then followed by recovering the symbol timing of the signal.

* * * * *